Feb. 26, 1963  A. G. CASTO ETAL  3,078,486
PLUMBER'S SNAKE METER

Filed Nov. 9, 1961  2 Sheets-Sheet 1

Alvin G. Casto
Elmer H. Duncan
INVENTORS

Feb. 26, 1963    A. G. CASTO ETAL    3,078,486
PLUMBER'S SNAKE METER
Filed Nov. 9, 1961                   2 Sheets-Sheet 2

Alvin G. Casto
Elmer H. Duncan
INVENTORS 3,078,486
PLUMBER'S SNAKE METER
Alvin G. Casto, 233 N. Lima Road, and Elmer H. Duncan, 243 N. Lima Road, both of Poland, Ohio
Filed Nov. 9, 1961, Ser. No. 151,371
4 Claims. (Cl. 15—104.3)

This invention generally relates to new and useful improvements in plumber's snakes and has for its primary object to provide, in a manner as hereinafter set forth, a novel means for accurately indicating the footage of a snake as it is extended from the usual drum to be fed into a drain or the like to be opened.

Another highly important object of the present invention is to provide a footage gauge or meter of the character described which is adapted to show the length of the snake remaining in the drain during the retrieving operation.

Still another very important object of the invention is to provide a meter of the aforementioned character wherein the footage indicating means is positively driven by the snake per se as said snake comes off the drum or is retrieved.

Another object of this invention is to provde a footage meter of the character set forth which is adapted to be incorporated in conventional plumbers' snakes without necessitating material structural alterations therein.

Other objects of the invention are to provide a plumber's snake meter which will be simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
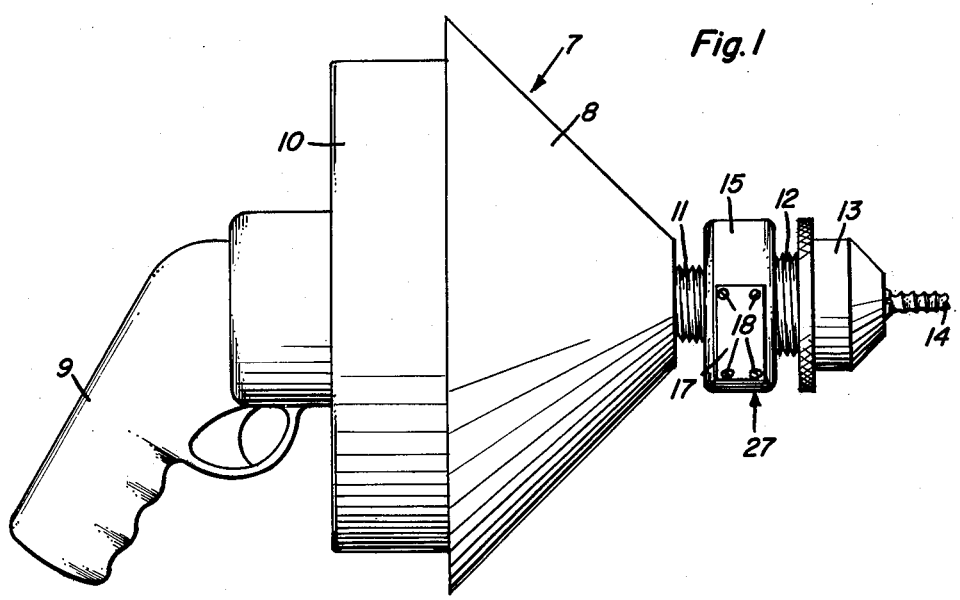
FIGURE 1 is a view in side elevation of a plumber's snake equipped with a footage meter constructed in accordance with the present invention.
Figure 2:
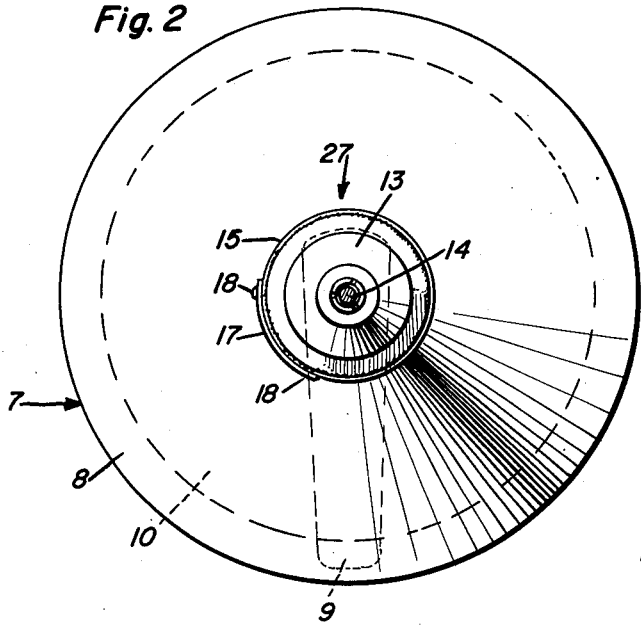
FIGURE 2 is a view in front elevation thereof.
Figure 6:
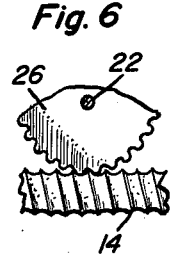
FIGURE 6 is a fragmentary view in side elevation showing how the counter or meter drive is taken directly from the snake, looking from the direction of line 6—6 in FIGURE 5.
Figure 3:
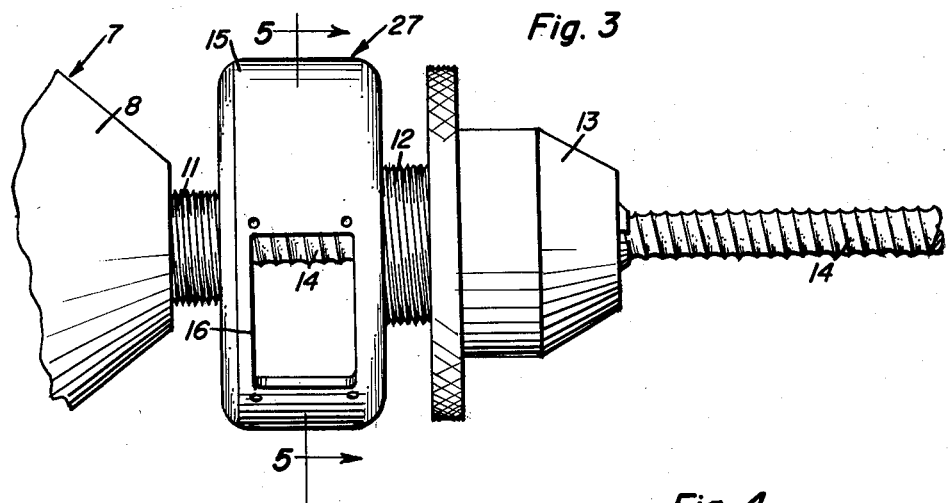
FIGURE 3 is a side elevational view of the device with the access plate omitted.
Figure 4:
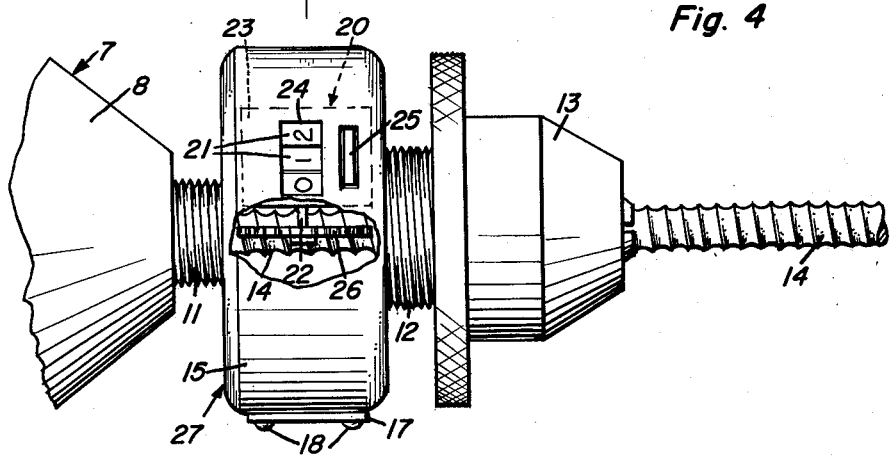
FIGURE 4 is a top plan view with a portion broken away to reveal the counter drive means.
Figure 5:
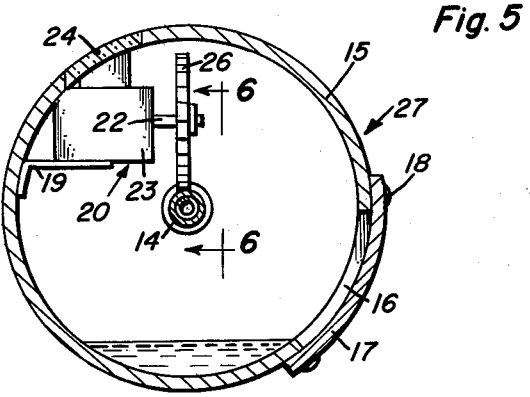
FIGURE 5 is a view in transverse section, taken substantially on the line 5—5 of FIGURE 3.

Referring now to the drawing in detail, it will be seen that reference numeral 7 designates generally a plumber's snake device of a type in widespread use. The device 7 includes the usual substantially conical stationary housing 8 carried by a rearwardly and downwardly extending pistol-type handle 9. The device 7 further includes a rotary drum 10. Affixed to the drum 10 for rotation therewith and projecting forwardly through and beyond the housing 8 is a tubular threaded neck 11. Mounted on the forward end portion of the neck 11 in communication and rotatable therewith is an indicator 27 comprising a generally cylindrical housing or casing 15. Mounted on the forward end of the housing 15 and communicating therewith is a threaded tube or nipple 12 having mounted thereon a chuck 13. Coiled in the drum 10 and projecting forwardly therefrom through the members 11, 15, 12 and 13 is a snake 14. As usual, the snake 14 is spirally ribbed or threaded. When the chuck 13 is locked the snake 14 rotates therewith, being driven thereby. When the chuck 13 is unlocked the snake 14 is slidable therethrough.

The members 11, 15, 12 and 13 provide what may be considered a tubular sectional guide for the snake 14. The housing 15 of the indicator 27 is provided with a circumferentially elongated access opening 16. The access opening 16 is closed by an arcuate plate 17 which is removably secured on the housing 15 by screws or other suitable fasteners 18.

Mounted on suitable supporting means 19 in the housing 15 is a footage meter or counter unit 20 of the type including a number of wheels or disks 21 operable on a shaft 22 in a casing 23. The numerals on the wheels or disks 21 are observable through a window 24 in the housing 15. The unit 20 further includes an exposed reset wheel 25. Fixed on the shaft 22 is a gear 26 which is meshed with the spirally threaded or ribbed snake 14 for operatively connecting said snake to the unit 20.

It is thought that the operation of the meter will be readily apparent from a consideration of the foregoing. Briefly, the chuck 13 is loosened in the usual manner to free or release the snake 14. The desired length of the snake 14 is then extended from the drum 10, after which the chuck 13 is tightened. When the snake 14 is thus extended or payed out the gear 26 is rotated thereby for actuating the counter 20 in an obvious manner. Thus, the footage of the snake which has been extended may be readily ascertained. The counter or unit 20 is reversible whereby the footage of the snake remaining in the drain when said snake is being retrieved may also be readily ascertained. The access plate 17 facilicates servicing the meter.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A snake device comprising, in combination, a rotary drum, a sectional guide including an externally threaded tubular neck fixedly mounted on the drum in communication therewith and for rotation therewith, a generally cylindrical housing threadedly mounted axially on the neck in communication therewith, a nipple threadedly mounted axially on the housing in communication therewith and aligned with the neck, a chuck threadedly mounted on said nipple, a snake in the drum slidable through the neck, the housing, the nipple and the chuck, adapted to be releasably locked by the latter to the drum for rotation thereby, a footage meter in the housing, and means operatively connecting the meter to the snake for actuation thereby in response to sliding movement thereof.

2. The combination of claim 1, said means including a spiral rib on the snake, and a gear on the meter meshed with the rib for actuation by the snake.

3. A snake device comprising, in combination, a rotary drum, an externally threaded tubular guide affixed to said drum, a flexible, spirally ribbed snake coiled in the drum and slidable through the guide, a removable housing mounted on the tubular guide and threadedly connected to the end portion thereof in communication therewith, a footage meter in the housing, and means operatively connecting the snake to the footage meter.

4. The combination of claim 3, wherein said means includes a gear in the housing operatively connected to the meter and engaged longitudinally with the snake for actuation by the rib thereof.

References Cited in the file of this patent
UNITED STATES PATENTS

| | | |
|---|---|---|
| 1,237,808 | Ottinger | Aug. 21, 1917 |
| 2,470,225 | Silverman | May 17, 1949 |
| 2,544,256 | Ciaccio | Mar. 6, 1951 |
| 2,591,615 | Saff et al. | Apr. 1, 1952 |
| 2,718,376 | Raney | Sept. 20, 1955 |
| 2,828,133 | Silverman | Mar. 15, 1958 |
| 2,854,753 | Caparros | Oct. 7, 1958 |